United States Patent [19]
Orne

[11] 3,725,805
[45] Apr. 3, 1973

[54] INFORMATION ENHANCING AMPLIFIER

[76] Inventor: Laurence E. Orne, 4 Erbar Circle, Billerica, Mass. 01821

[22] Filed: June 7, 1972

[21] Appl. No.: 260,647

[52] U.S. Cl. ..................................330/136, 330/149
[51] Int. Cl. ..............................................H03f 3/00
[58] Field of Search ......330/136, 149; 325/474, 475; 328/165

[56] References Cited

UNITED STATES PATENTS 2,756,328 7/1956 Braak ..............................330/136 X

*Primary Examiner*—Roy Lake
*Assistant Examiner*—James B. Mullins
*Attorney*—Harry A. Herbert, Jr. et al.

[57] ABSTRACT

An information enhancing amplifier for insertion in a communication system. The amplifier includes a dual input signal representative of information. The input signal also includes noise. One circuit cathode detects the modulation substantially to the exclusion of the noise. The detected signal is applied to control the amplification of the other circuit to provide an output signal representative of virtually the information only.

3 Claims, 1 Drawing Figure

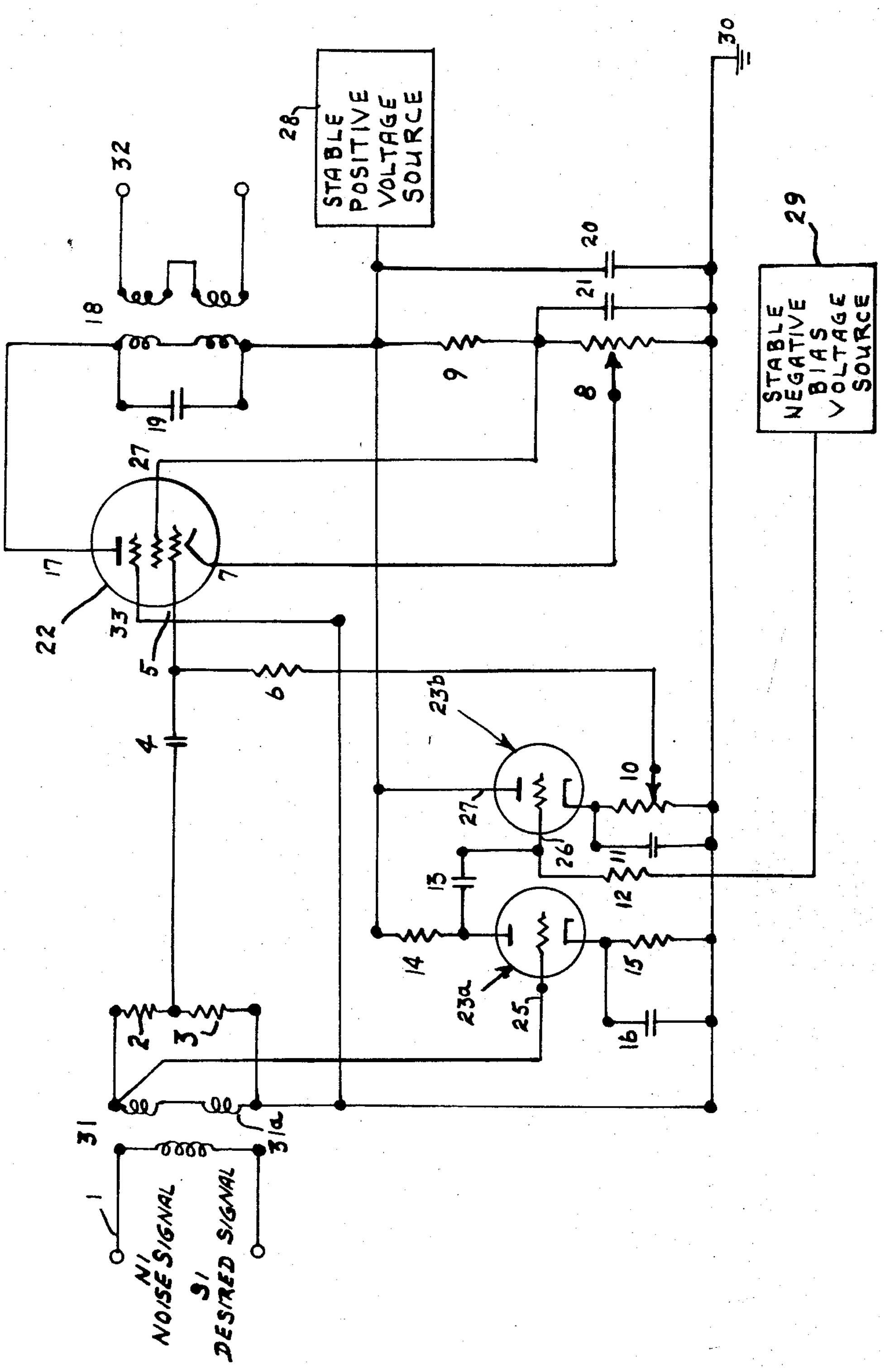
STABLE POSITIVE VOLTAGE SOURCE
STABLE NEGATIVE BIAS VOLTAGE SOURCE
N1 NOISE SIGNAL
S1 DESIRED SIGNAL

INFORMATION ENHANCING AMPLIFIER

BACKGROUND OF THE INVENTION

There has been a considerable limitation in the recovery of the information content of a signal because of the noise impressed upon the signal during the period the signal is being processed. For example, when the information content is impressed upon a signal for transmission purposes, noise also is added thereto. When the transmitted signal is received, again there may be additional noise added at the input of the receiver system. Therefore, it is extremely desirable to provide an amplifier which permits considerable enhancement of the information content from a noisy signal.

In digital data and teletype communication systems, when signal levels fall to less than 8 db above system noise, error rates become excessive and reception unreliable. The amplifier of the present invention is capable of recovering a usable voice-frequency by teletype signal from signal-to-noise conditions as low as 3 db, effectively bringing unusable signals far enough above noise to yield teletype copy whose accuracy is better than 98 percent or better. It is applicable not only to single channel but also to multiplex signals.

The information enhancing amplifier of the present invention is an improvement over the U.S. Patent entitled, "Signal-To-Noise Enhancing Amplifier" by Laurence E. Orne, bearing U.S. Pat. No. 3,314,020 issued Apr. 11, 1967. In the operation of the amplifier of the aforementioned patent, low level input signals between −55 to −42 dbm produced signal variations and high values of input signals caused circuit limiting action with consequent distortion. The amplifier of the present invention operates linearly over a wider dynamic range of input signals and there is a substantial improvement in distortion.

SUMMARY OF THE INVENTION

An information enhancing amplifier is provided having a dual input circuit. A voltage divider receives the modulated signal of interest by way of a transformer and a preselected portion of the signal is fed to the firstwhich has a preselected threshold and is the input circuit normally very near cutoff. The entire modulated signal of interest is fed to the second input circuit which includes a cathode follower detector. The cathode follower detector also has a preselected threshold and provides a DC bias voltage to the first input circuit for the control of the amplification thereof. The DC bias voltage because of the threshold characteristics of the cathode follower detector eliminates much of the noise. Thus the first circuit, normally near cutoff, upon the receipt of the DC bias voltage amplifies a preselected position of the modulated signal of interest in accordance with a noise-free DC signal. The information in the modulated signal of interest is enhanced over a wide dynamic range without distortion.

DESCRIPTION OF THE DRAWING

The single FIGURE of the present invention is shown in schematic form and represents a preferred embodiment.

DETAILED DESCRIPTION OF THE PREFERRED EMBODIMENT

Now referring in detail to the single FIGURE of the invention, signals S1 and noise N1 received over conventional telephone line 1 are coupled by transformer 31 to the input circuit consisting of a voltage divider resistors 2 and 3 connected to the secondary winding 31*a* of transformer 31. The resistance ratio is 1 to 10 such that the signal input to grid circuit 5 of electron tube 22 is one-tenth the signal potential at grid circuit 25 of electron tube 23*a*. Capacitor 4 couples the signal at the junction of resistors 2 and 3 to the control grid circuit 5 of electron tube 22. Capacitor 4 prevents the modulated DC potential bias voltage to be applied to the common input circuit consisting of transformer 31 and resistors 2 and 3.

Under no signal conditions, positive bias voltage is applied to cathode 7 of electron tube 22 by the adjustment of potentiometer 8 such that the current at plate 17 is near cutoff. The grid circuit 5 of electron tube 22 is at a negative potential since there is no current flow through grid resistor 6 and potentiometer 10 to ground 30. Electron tube 23*b* is nonconducting thus there is no current flow from plate 27 to ground 30 via potentiometer 10. It is noted that electron tube 23*b* does not conduct under no signal conditions because stable negative bias voltage source 29 is applied to grid 26 via grid resistor 12.

Plate circuit 17 of electron tube 22 is connected through the primary winding of transformer 18 to stable positive anode voltage source 28. Screen grid control voltage is supplied from the junction of resistor 9 and potentiometer 8. Capacitor 20 is the filter for the anode voltage while capacitor 21 is the filter for the voltage at screen grid 27 which appears at the junction of resistor 9 and potentiometer 8. Capacitor 19 prevents high frequency oscillation from occurring because of the counter EMF generated in the primary winding of transformer 18. Current flow from plate 17 of electron tube 22 results when grid circuit 5 is modulated by the applied signal bias voltage when potentiometer 10 is adjusted to the proper threshold level and electron tube 23*b* is in a conducting state.

The signal level applied to grid circuit 25 of electron tube 23*a* is ten times greater than the signal applied to grid circuit 5 of electron tube 22. Triode amplifier 23*a* operates as a conventional amplifier. Plate resistor 14 provides the output voltage to control the threshold level of electron tube 23*b*. Resistor 15 and capacitor 16 provide grid bias voltage to electron tube 23*a*. Capacitor 13 provides the signal input to grid circuit 26 of electron tube 23*b*. Signals of high amplitudes cause electron tube 23*b* to conduct a DC signal current through potentiometer 10. Capacitor 11 provides only a residual storage to the peak signal voltage of the sine wave during the modulation process of controlling the amplification of electron tube 22. The output signal from tube 22 is obtained at terminal 32 by way of transformer 18.

The advantage of the circuit provided for the Varo Repeater operates on signal inputs between −22 to −10 dbm. Another advantage proposed with the design of the Varo Repeater is the fixed negative 24 volt DC supply that under no condition varies with any current changes due to electron tube operation of FIG. 1 identified in U. S. Pat. No. 3,314,020. It should be noted that due to switching currents, there are slight voltage regulations across resistors 31, 32, 33 and 34. These slight current variations cause a change in cathode 28 bias voltage of electron tube 26.

The advantages of adjustments of potentiometers 8 and 10 provide linear signal threshold levels that permit electron tube to function without high signal distortion in the circuit over a wide dynamic range of input voltages.

In the operation of the information enhancing amplifier, amplifying tube 22 is normally very near cutoff. The threshold level therefore is precisely set by the adjustment of potentiometer 8. Without a signal input tube 22 will not conduct because of the precise control of the threshold level. With a signal input above a preselected threshold level, tube 22 amplifies. Tube **23*a* is a conventional amplifier and is so adjusted as to conduct and amplify continuously. Tube 23*a* without a signal input is nonconductive and does not draw any current because of biasing. It has a preselected threshold level (as controlled by potentiometer 10). With a signal input, tube 23*b* draws current and provides a varying positive DC voltage that is applied to grid 5 of tube 22 which causes tube 22 to amplify in accordance therewith. It is noted that the threshold level for normally cutoff tube 23*b* is set so that virtually all of the noise component of the input signal is eliminated. In the case of a speech signal, for example, tube 23*b* provides a modulated DC bias to tube 22 in accordance only with the speech frequency and amplitude so that the biasing of tube 22 varies only with speech and consequently the amplification of tube 22** varies with the speech and not the noise.

The information enhancing amplifier of the present invention operates with input signal as low as −22 to −10 dbm. Another advantage in the operation thereof is provided by the stable positive and negative voltages which prevent any current changes from effecting the operation of tubes 22 and **23*b*** because of variation in the preset threshold levels.

What is claimed is:

1. An information enhancing amplifier for inclusion in a communication system comprising a first transformer having a primary and secondary, said transformer receiving a varying informational electrical signal representative of speech, said received signal also including noise, a voltage divider connected across said secondary, said voltage divider providing an output signal of one-tenth the amplitude of the signal across said secondary, a first amplifying tube receiving said output signal from said voltage divider, first means to precisely control the threshold level of said first amplifying tube to prevent conduction therein until the receipt of an input signal, a second amplifier tube receiving the signal from across said secondary, a cathode follower detector receiving the output signal from said second amplifier tube, second means to precisely control the threshold level of said cathode follower detector to prevent conduction therein until receipt of an input signal, said threshold level being also precisely set to exclude virtually all of the noise, said cathode follower detector providing a varying DC bias voltage in accordance with the received varying informational electrical signal, means to apply said varying DC bias voltage to said first amplifying tube to control the amplification thereof in accordance with the variation in voltage, and a second transformer connected to said first amplifying tube to provide an output signal therefrom.

2. An information enhancing amplifier as described in claim 1 wherein said voltage divider consists of a first and second resistor in a series arrangement.

3. An information enhancing amplifier as described in claim 2 further including a stable positive voltage source for said first and second amplifying tubes and a stable negative voltage source for said cathode follower detector.

* * * * *